(12) United States Patent
Yoshida et al.

(10) Patent No.: US 8,704,990 B2
(45) Date of Patent: Apr. 22, 2014

(54) ELECTRO-OPTICAL DISPLAY APPARATUS

(75) Inventors: Shuhei Yoshida, Tottori (JP); Keiji Takizawa, Tottori (JP)

(73) Assignee: Japan Display West Inc., Aichi-Ken (JP)

( * ) Notice: Subject to any disclaimer, the term of this patent is extended or adjusted under 35 U.S.C. 154(b) by 352 days.

(21) Appl. No.: 13/037,451

(22) Filed: Mar. 1, 2011

(65) Prior Publication Data

US 2011/0216272 A1     Sep. 8, 2011

(30) Foreign Application Priority Data

Mar. 5, 2010     (JP) ................ P2010-048827

(51) Int. Cl.
*G02F 1/1335*     (2006.01)
*G02F 1/1343*     (2006.01)
(52) U.S. Cl.
USPC .......................................... 349/145; 349/109
(58) Field of Classification Search
USPC .............. 349/106, 109, 145, 146, 84
See application file for complete search history.

(56) References Cited

U.S. PATENT DOCUMENTS 6,100,861 A  *  8/2000  Cohen et al. ................. 345/88
6,348,958 B1 *  2/2002  Matsuoka et al. ........... 349/106
7,817,124 B2 * 10/2010  Shin et al. .................... 345/87
2007/0070272 A1 *  3/2007  Gettemy et al. ............. 349/114
2007/0109468 A1   5/2007  Oku
2008/0174727 A1 *  7/2008  Iijima .......................... 349/109

FOREIGN PATENT DOCUMENTS

| JP | 10-254378 | 9/1998 |
| JP | 2005-084513 | 3/2005 |
| JP | 2005-128424 | 5/2005 |
| JP | 2005-315960 | 11/2005 |
| JP | 2007-093668 | 4/2007 |
| JP | 2007-140430 | 6/2007 |

OTHER PUBLICATIONS

Japanese Office Action issued Aug. 9, 2013 in corresponding Japanese Patent Application No. 2010-048827.

* cited by examiner

*Primary Examiner* — Edward Glick
*Assistant Examiner* — Dennis Y Kim
(74) *Attorney, Agent, or Firm* — K&L Gates LLP

(57) ABSTRACT

An electro-optical display apparatus includes a display area in which sub-pixel columns formed of sub-pixels of the same color that are linearly arranged in a single direction are disposed in a stripe arrangement together with sub-pixel columns of other colors. An aperture ratio of each sub-pixel in at least one sub-pixel column located at one edge of the display area in an arrangement direction of the sub-pixel columns and at least one sub-pixel column located at another edge of the display area in the arrangement direction of the sub-pixel columns are configured to be lower than those of sub-pixels of the same color located in a center portion of the display area.

4 Claims, 6 Drawing Sheets

10A, 10B

ELECTRO-OPTICAL DISPLAY APPARATUS

CROSS REFERENCES TO RELATED APPLICATIONS

The present application claims priority to Japanese Priority Patent Application JP 2010-048827 filed in the Japan Patent Office on Mar. 5, 2010, the entire contents of which are hereby incorporated by reference.

BACKGROUND

The present application relates to an electro-optical display apparatus, and more specifically to an electro-optical display apparatus having a display area in which sub-pixel columns formed of sub-pixels of the same color that are linearly arranged in a single direction are disposed in a stripe arrangement together with sub-pixel columns of other colors, the electro-optical display apparatus being configured so that false colors are hardly visible at two edges of a display area in the arrangement direction of the sub-pixel columns.

An electro-optical display apparatus of an active matrix type such as a liquid crystal display apparatus, an organic electroluminescent (EL) display apparatus, an inorganic EL display apparatus, a plasma display apparatus, an electrophoretic display apparatus, or a field emission display has thin film transistors (TFTs) as switching elements. In an electro-optical display apparatus of an active matrix type, metal wiring is patterned at least on a substrate by a photolithography method. The metal wiring includes scan lines and signal lines formed in a display area. Regions surrounded by the scan lines and the signal lines form sub pixels, and a single pixel is formed of sub-pixels of three colors of, for example, red (R), green (G), and blue (B) (another color may be further included) (refer to Japanese Unexamined Patent Application Publication No. 2007-093668).

Methods for arranging sub-pixels of red (R), green (G), and blue (B) include a diagonal arrangement illustrated in FIG. 6A, a triangular arrangement illustrated in FIG. 6B, and a stripe arrangement illustrated in FIG. 6C. In particular, an electro-optical display apparatus having a display area in which sub-pixel columns formed of sub-pixels of the same color that are linearly arranged in a single direction are disposed in a stripe arrangement together with sub-pixel columns of other colors is frequently adopted in monitors of mobile phones and personal computers and the like because high definition can be easily obtained therewith and the fabrication thereof is easy.

SUMMARY

However, with an electro-optical display apparatus in which sub-pixels of the same color are disposed in a stripe arrangement as described above, so-called "false colors" (colors that are not originally intended) may be seen at portions around two edges of a display area. That is, in an electro-optical display apparatus in which sub-pixels of the same color are disposed in a stripe arrangement, since two edges in the arrangement direction of sub-pixels columns are each formed of a sub-pixel column of a particular color, the colors of the sub-pixel columns can be undesirably seen by human eyes, which have good sensitivity and resolution. For example, when a sub-pixel column of red (R) is formed at one edge of the display area and a sub-pixel column of blue (B) is formed at the other edge of the display area, even if the sub-pixel columns at the two edges are displayed in achromatic colors, one edge may seem red (R) and the other edge may seem blue (B) due to the characteristics of human eyes.

This phenomenon hardly occurs in an electro-optical display apparatus adopting the diagonal arrangement illustrated in FIG. 6A or the triangular arrangement illustrated in FIG. 6B, and uniquely occurs in an electro-optical display apparatus adopting the stripe arrangement illustrated in FIG. 6C. Furthermore, in an electro-optical display apparatus in which sub-pixels of the same color are disposed in a stripe arrangement, the phenomenon is likely to occur when the two edges of the display area in the arrangement direction of sub-pixel columns are viewed from an oblique direction. The phenomenon occurs not only in large-size electro-optical display apparatuses but also in small-size electro-optical display apparatuses.

The inventors have conducted various studies in order to suppress generation of false colors at the two edges in the arrangement direction of the sub-pixel columns in an electro-optical display apparatus in which sub-pixels of the same color are disposed in a stripe arrangement as described above. As a result, the inventors have completed the present application by discovering that generation of false colors can be suppressed by reducing the aperture ratios of the sub-pixel columns located at the two edges of the display area in the arrangement direction of the sub-pixel columns to be lower than those of sub-pixels in a center portion of the display area. That is, in an electro-optical display apparatus having a display area in which sub-pixel columns formed of sub-pixels of the same color that are linearly arranged in a single direction are disposed in a stripe arrangement together with sub-pixel columns of other colors, it is desirable to provide an electro-optical display apparatus that is configured so that false colors are hardly visible at the two edges in the arrangement direction of the sub-pixel columns.

An electro-optical display apparatus according to an embodiment includes a display area in which sub-pixel columns formed of sub-pixels of the same color that are linearly arranged in a single direction are disposed in a stripe arrangement together with sub-pixel columns of other colors. An aperture ratio of each sub-pixel in at least one sub-pixel column located at one edge of the display area in an arrangement direction of the sub-pixel columns and at least one sub-pixel column located at another edge of the display area in the arrangement direction of the sub-pixel columns are configured to be lower than those of sub-pixels of the same color located in a center portion of the display area.

In the electro-optical display apparatus according to an embodiment, the aperture ratio of each sub-pixel in the at least one of the sub-pixel columns located at the two edges of the display area in the arrangement direction of the sub-pixel columns is configured to be lower than that of the sub-pixels of the same color located in the center portion of the display area. In doing so, the luminance of the sub-pixel columns located at the two edges of the display area in the arrangement direction of the sub-pixel columns is reduced to be lower than that originally offered, thereby causing false colors to be hardly visible at the two edges of the sub-pixel columns in the arrangement direction.

In addition, in the electro-optical display apparatus according to an embodiment, the display area includes a pixel column that is formed of sub-pixel columns of three colors of red, green, and blue and that is arranged adjacent to another pixel column, and the sub-pixel columns located at the two edges in the arrangement direction of the sub-pixel columns are red and blue, respectively.

In general, when a pixel is formed of three sub-pixels of red, green, and blue, the luminosity is highest for green, that is, the luminosities of blue and red are lower than that of green. Therefore, it is preferable not to arrange sub-pixels of green at the two edges of the display area in order to cause false colors to be hardly visible at the two edges of the display area in the arrangement direction of the sub-pixel columns.

In addition, in the electro-optical display apparatus according to an embodiment, it is preferable that, if the aperture ratios of the sub-pixels of the same color located in the center portion of the display apparatus are assumed to be 100%, the aperture ratio of each sub-pixel in the sub-pixel columns located at the two edges of the display area in the arrangement direction of the sub-pixel columns is set to 40% to 80%.

By setting the aperture ratio of each sub-pixel in the at least one of sub-pixel columns located at the two edges of the display area in the arrangement direction of the sub-pixel columns to such a value, false colors can be suppressed from being visible more efficiently. When the aperture ratio of each sub-pixel in the sub-pixel columns located at the two edges of the display area in the arrangement direction of the sub-pixel columns is lower than 40%, color display that is nearly normal is difficult at the two edges of the display area in the arrangement direction of the sub-pixel columns, and, instead of above-mentioned each sub-pixel, sub-pixels inwardly adjacent to the above-mentioned each sub-pixel may cause false colors to be visible, which is undesirable. In contrast, when the aperture ratio of each sub-pixel in the sub-pixel columns located at the two edges of the display area in the arrangement direction of the sub-pixel columns is higher than 80%, it is difficult to suppress false colors from being visible.

In the present application, the aperture ratio of each sub-pixel in two sub-pixel columns that are each inwardly adjacent to the sub-pixel columns located at the two edges in the arrangement direction of the sub-pixel columns may be set to a ratio having a value between that of the aperture ratio of each sub-pixel in the sub-pixel columns located at the two edges in the arrangement direction of the sub-pixel columns and that of the aperture ratios of the sub-pixels of the same color located in the center portion of the display area.

According to an electro-optical display apparatus according to an embodiment, since false colors are hardly visible at the at least one of sub-pixel columns located at the two edges in the arrangement direction of the sub-pixel columns and at the sub-pixel columns located inward from the above sub-pixel columns, an excellent effect can be obtained in terms of causing false colors to be hardly visible. In an electro-optical display apparatus according to an embodiment, the number of sub-pixel columns that are located inward from the at least one of sub-pixel columns located at the two edges in the arrangement direction of the sub-pixel columns and whose aperture ratios are reduced may be two or more. However, if the number of sub-pixel columns located at the two edges in the arrangement direction of the sub-pixel columns whose aperture ratios are reduced increases, the two edges in the arrangement direction of the sub-pixel columns proportionally seem slightly blurred and the screen feels smaller. In contrast, if the number of sub-pixel columns located at the two edges in the arrangement direction of the sub-pixel columns whose aperture ratios are reduced is small, the display seems sharper.

In this case, the following are preferable. The display area includes a pixel column that is formed of sub-pixel columns of three colors of red, green, and blue and that is arranged adjacent to another pixel column. The sub-pixel columns located at the two edges in the arrangement direction of the sub-pixel columns are red and blue, respectively. If the aperture ratios of the sub-pixels of the same color located in the center portion of the display apparatus are assumed to be 100%, the aperture ratio of each sub-pixel in the sub-pixel columns located at the two edges of the display area in the arrangement direction of the sub-pixel columns is set to 30% to 50% for the sub-pixel column of red and 10% to 30% for the sub-pixel column of blue. The aperture ratios of sub-pixel columns of green that are each inwardly adjacent to the sub-pixel columns of red and blue are set to 50% to 70%.

In general, in an electro-optical display apparatus, three sub-pixels of, for example, red, green, and blue that form a pixel are arranged in a certain order. In addition, the sensitivity of human eyes varies depending on the color, namely, red, green, or blue. Therefore, when the aperture ratios of the sub-pixel columns located at the two edges in the arrangement direction of the sub-pixel columns and those of the sub-pixels located inward from the above sub-pixel columns are both changed, if the aperture ratios of the sub-pixel columns located at the two edges in the arrangement direction of the sub-pixel columns are adjusted as described above in accordance with the color, false colors can be better suppressed from being visible at the sub-pixel columns located at the two edges in the arrangement direction of the sub-pixel columns.

In addition, in general, when a pixel is formed of three sub-pixels of red, green, and blue, the luminosity is highest for green and lowest for red. Therefore, in order to cause false colors to be hardly visible at the two edges of the display area in the arrangement direction of the sub-pixel columns, it is preferable not to arrange sub-pixels of green at the two edges of the display area in the arrangement direction of the sub-pixels. In sub-pixel columns of red and blue located at the two edges of the display area in the arrangement direction of the sub-pixel columns, it is preferable to slightly increase the aperture ratios of the sub-pixels of red compared to those of sub-pixels of blue.

Additional features and advantages are described herein, and will be apparent from the following Detailed Description and the figures.

DETAILED DESCRIPTION

Figure 1:
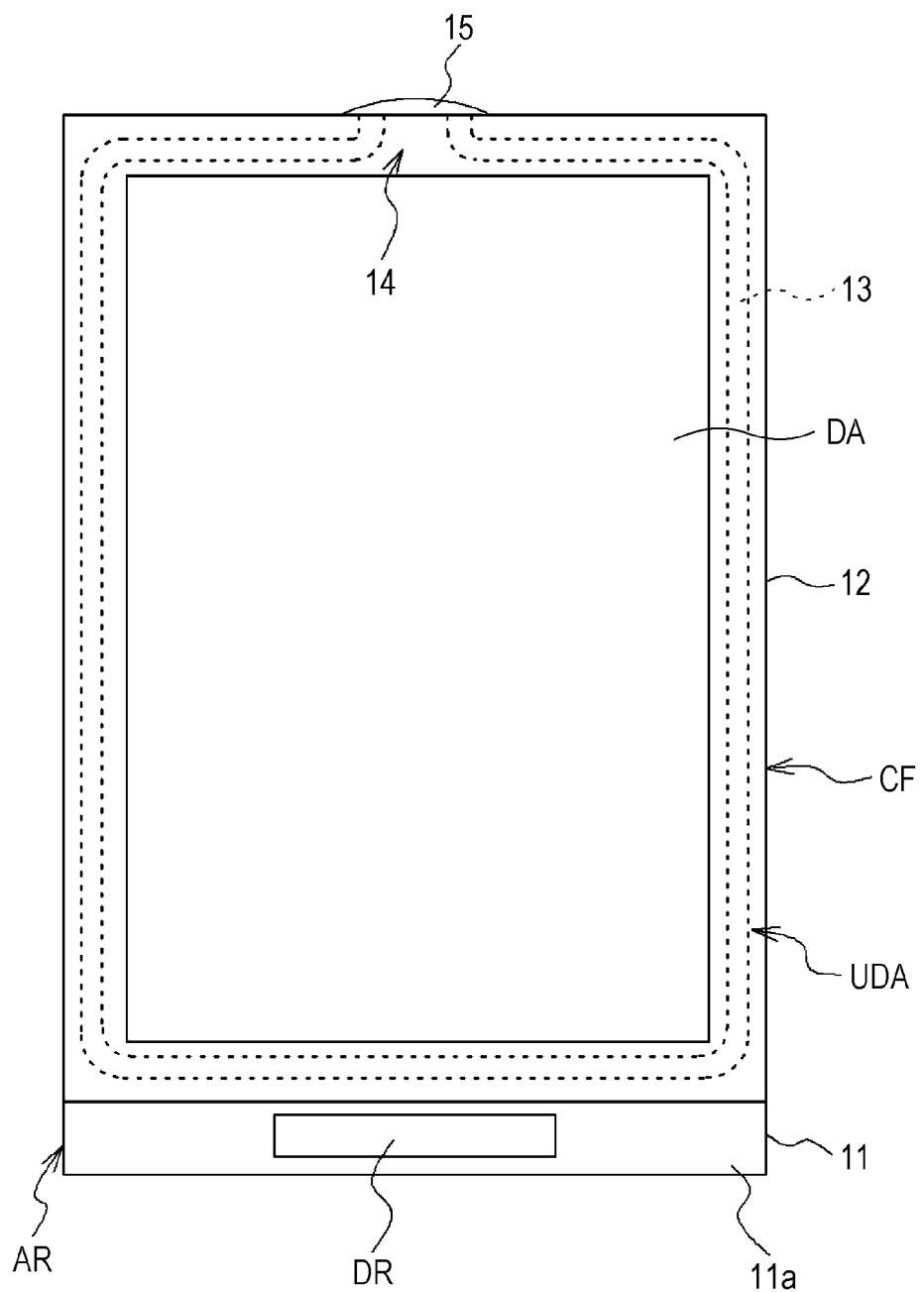
FIG. 1 is a plan view illustrating the schematic configuration of a liquid crystal display apparatus common to a first embodiment and a second embodiment.

Embodiments of the present application will be described below in detail with reference to the drawings.

However, it is to be understood that the embodiment described below is not intended to limit the present application to what is described herein. The present application may also be applied to an electro-optical display apparatus such as an EL display apparatus, a plasma display apparatus, an electrophoretic display apparatus, a field emission display, or the like as well, as long as the technical idea described in the claims is not deviated from. It is to be noted that each of the drawings used for illustration herein is presented with a different scale used for each layer or member illustrated therein in order to allow the layers and members to have dimensions large enough to be recognized in the drawings. The dimensions are not necessarily proportional to the actual ones.

First Embodiment

First, the configuration of a liquid crystal display apparatus 10A according to a first embodiment will be described with reference to FIGS. 1 to 4. As described in FIG. 1, in the liquid crystal display apparatus 10A according to the first embodiment, an array substrate AR that is obtained by forming various types of wiring on a first transparent substrate 11 composed of glass or the like and a color filter substrate CF that is obtained by forming a color filter layer or the like on a second transparent substrate 12 composed of glass or the like are arranged in such a way that the array substrate AR and the color filter substrate CF face each other. The array substrate AR and the color filter substrate CF are bonded to each other with a sealing material 13, and a space formed by the sealing material 13 is filled with liquid crystal LC (refer to FIG. 3).

In the space surrounded by the sealing material 13, a plurality of unit pixels formed of sub-pixels Sub (refer to FIG. 4) of three colors, namely, for example, red (R), green (G), and blue (B) that are adjacent to one another are formed. The unit pixels are arranged as a matrix to form a display area DA. A non-display area UDA (also called a "frame area") is formed at the edges of the display area DA. The liquid crystal LC is arranged in the space surrounded by the sealing material 13.

The array substrate AR to be used has a size slightly larger than the color filter substrate CF so that a protruding portion having a certain size is formed when the array substrate AR and the color filter substrate CF are arranged in such a way that the array substrate AR and the color filter substrate CF face each other. The protruding portion serves as a mounting area 11a on which an integrated circuit DR of a driver for driving the liquid crystal LC or the like is arranged. The liquid crystal display apparatus 10A according to the first embodiment is an example in which a liquid crystal injection port 14 is formed by the sealing material 13 and sealed by a sealant 15.

Next, the configuration of each substrate will be described with reference to FIGS. 2 and 3. First, in the array substrate AR, a plurality of scan lines 16 including gate electrodes G that are formed of two-layer wiring of, for example, Mo/Al are formed on the surface of the first transparent electrode 11 parallel to one another. In addition, a gate insulating film 17 composed of a transparent insulating material such as silicon nitride or silicon oxide covers the entire surface of the first transparent substrate 11 on which the scan lines 16 have been formed. Furthermore, semiconductor layers 18 formed of, for example, amorphous silicon layers are formed in regions in which thin film transistors TFTs are to be formed as switching elements on the surface of the gate insulating film 17. A region of each scan line 16 at the position at which the semiconductor layer 18 is formed forms the gate electrode G of each thin film transistor TFT.

Signal lines 19 including source electrodes S that are formed of conducting layers having a three-layer structure of, for example, Mo/Al/Mo, and drain electrodes D are formed on the surface of the gate insulating film 17. The source electrode S included in each of the signal lines 19 and each drain electrode D both partially overlap the surface of the semiconductor layer 18. In addition, a passivation film 20 composed of a transparent insulating material such as silicon nitride or silicon oxide covers the entire surface of the array substrate AR. Furthermore, an interlayer film 21 composed of, for example, a resin material covers the entire surface of the passivation film 20, and contact holes 22 are formed in the passivation film 20 and the interlayer film 21 at positions corresponding to the drain electrodes D.

Figure 2:
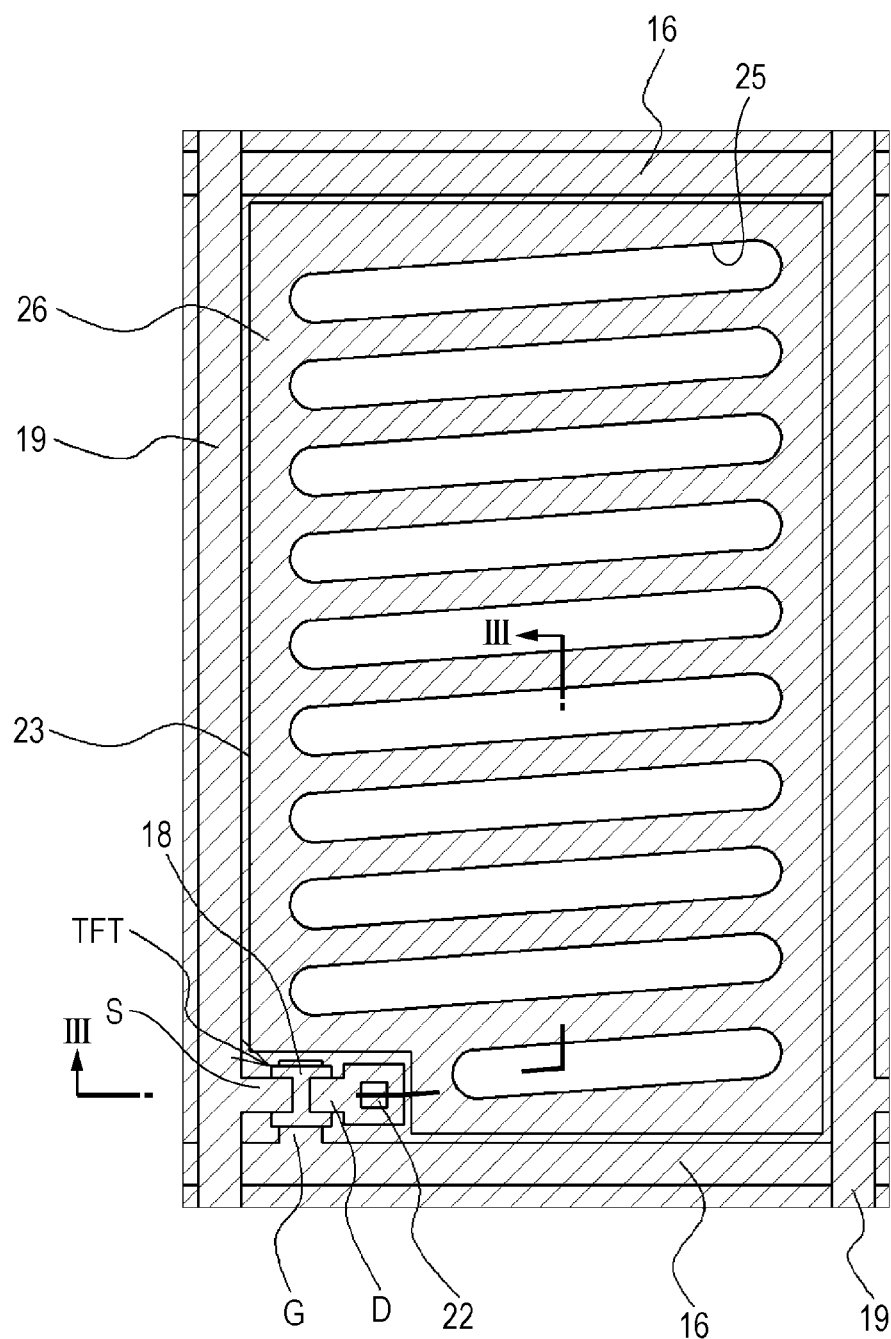
FIG. 2 is a plan view of a sub-pixel of the liquid crystal display apparatus of FIG. 1.

A lower electrode 23 composed of, for example, a transparent conducting material such as indium tin oxide (ITO) or indium zinc oxide (IZO) is formed on the interlayer film 21 in the region of each sub-pixel Sub that is surrounded by the scan lines 16 and the signal lines 19 so that the pattern illustrated in FIG. 2 is obtained. The lower electrode 23 is electrically connected to each drain electrode D through each contact hole 22. Therefore, the lower electrode 23 operates as a pixel electrode. Furthermore, an inter-electrode insulating film 24 is formed on the lower electrode 23. A transparent insulating material that provides good insulation such as silicon nitride is used for the inter-electrode insulating film 24.

A plurality of upper electrodes 26 having, for example, slit-like apertures 25 that have shapes of bars in plan view and that are composed of a transparent conducting material such as ITO or IZO are formed on the inter-electrode insulating film 24 in the regions of sub-pixels Sub. A certain alignment film (not illustrated) is formed over the entire surface of the array substrate AR. The upper electrodes 26 are formed over the entire display area DA and electrically connected to common wiring (omitted from the drawings) at the non-display area UDA. Therefore, the upper electrodes 26 operate as common electrodes.

Figure 3:
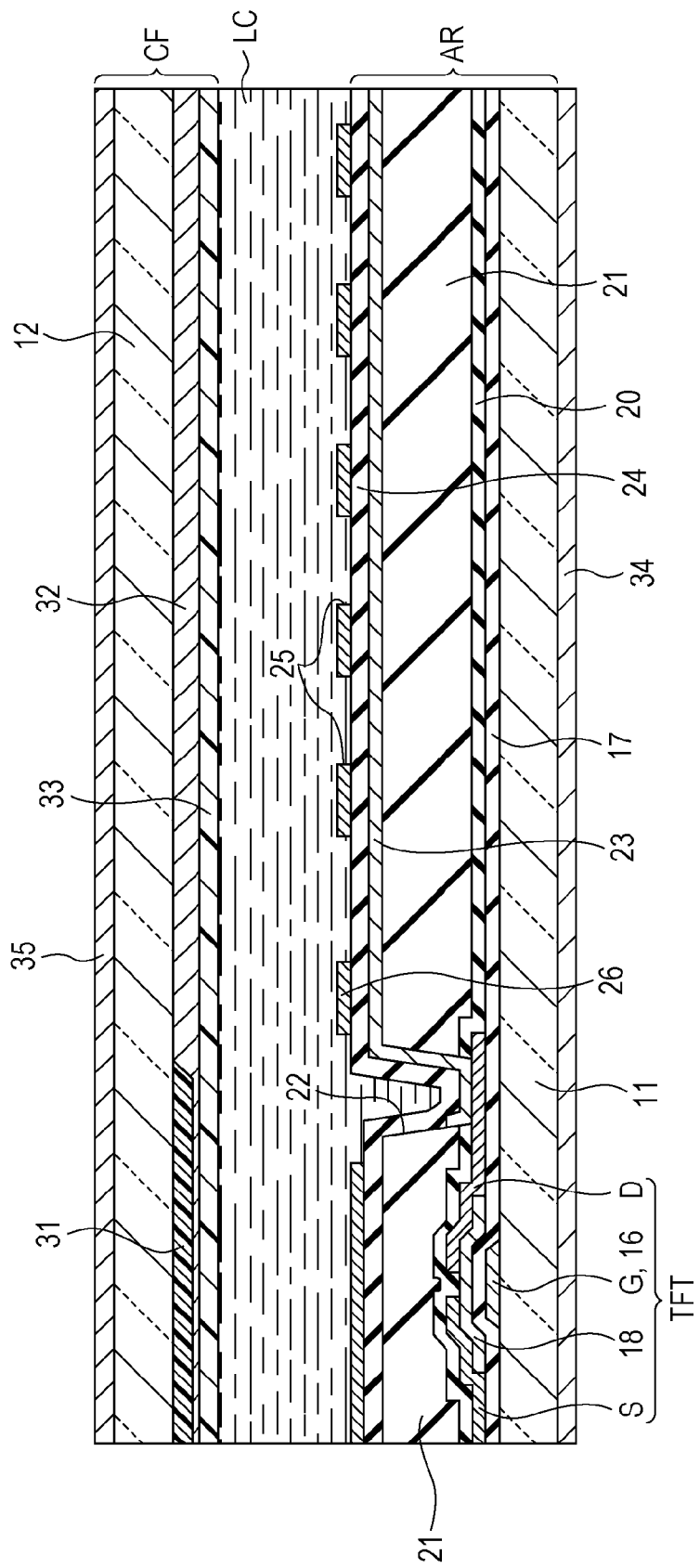
FIG. 3 is a sectional view taken along line of FIG. 2.

As illustrated in FIG. 3, in the color filter substrate CF, a light-shielding layer 31 is formed on the second transparent substrate 12 formed of a glass substrate or the like so that the light-shielding layer 31 covers positions corresponding to the scan lines 16, the signal lines 19, the thin film transistors TFTs, and the non-display area UDA of the array substrate AR. The light-shielding layer 31 is composed of, for example, a resin material mixed with a metal or opaque pigment such as chromium.

Color filter layers 32 of a plurality of colors, namely, for example, three colors of red (R), green (G), and blue (B) are formed on the surface of the second transparent substrate 12 on which the light-shielding layer 31 has been formed. The color filter layers 32 are formed in a stripe pattern in which a color filter layer for each color of red (R), green (G), and blue (B) linearly extends in the column direction.

Furthermore, an overcoat layer 33 composed of a transparent resin is formed so that the surfaces of the light-shielding layer 31 and the color filter layers 32 are covered thereby. An alignment film (omitted from the drawings) is formed on the surface of the overcoat layer 33, extending over the entire surface of the color filter substrate CF. Polarizing plates 34 and 35 that are arranged with respect to each other as crossed Nicols are provided on the outer surfaces of the array substrate AR and the color filter substrate CF, respectively. Therefore, the liquid crystal display apparatus 10A operates in a normally black mode.

The sealing material 13 is applied to either the array substrate AR or the color filter substrate CF and then the array substrate AR and the color filter substrate CF are bonded. After that, the liquid crystal LC is injected from the liquid crystal injection port 14 that has been formed using the sealing material 13, and the liquid crystal injection port 14 is sealed by the sealant 15. The integrated circuit DR of a driver or the like is then arranged on the mounting area 11a and thus the liquid crystal display apparatus 10A according to the first embodiment is obtained.

Figure 4:
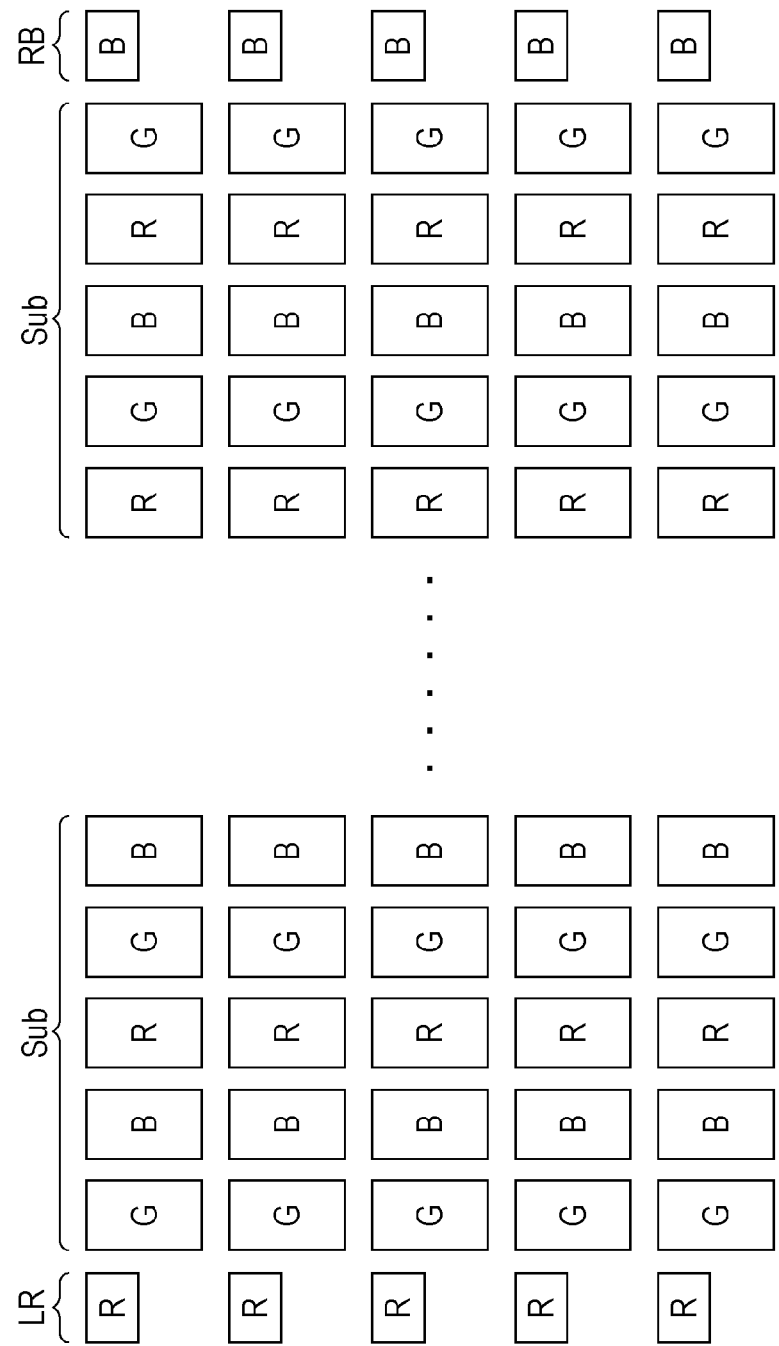
FIG. 4 is a diagram illustrating the configuration of sub-pixels at both left and right edges of a display area in the liquid crystal apparatus according to the first embodiment.

In the liquid crystal display apparatus 10A according to the first embodiment, a plurality of unit pixels are formed in the row (scan line) direction and the column (signal line) direction and thereby a stripe arrangement in which, as illustrated in FIG. 4, sub-pixels Sub of the same color are, for example, longitudinally and linearly arranged is obtained. In addition, in the liquid crystal display apparatus 10A according to the first embodiment, a column of sub-pixels LR of red (R) that is located at the left edge of the display area DA and a column of sub-pixels RB of blue (B) that is located at the right edge of the display area DA are configured such that an aperture ratio of each sub-pixel is lower than those of sub-pixels Sub located at the inner side of the display area DA. More specifically, if the aperture ratios of sub-pixels Sub of the same color located in a center portion of the display area DA are assumed to be 100%, the column of the sub-pixels LR at the left edge and the column of the sub-pixels RB at the right edge are both configured such that an aperture ratio of each sub-pixel is 40% to 80%.

As described above, in the liquid crystal display apparatus 10A according to the first embodiment, the aperture ratio of each sub-pixel in a column located at either edge of the sub-pixel columns of the display area DA in the arrangement direction, that is, the left or right edge is, even if the colors at the left and right edges are different, similarly adjusted to be smaller than those of sub-pixels Sub of the same color located in a center portion of the display area DA. By adopting such a configuration, the luminance of the columns of the sub-pixels LR and RB of the same colors located at both left and right edges of the display area DA is reduced from that originally offered, thereby making it possible to suppress generation of false colors at both left and right edges.

The aperture ratio of each sub-pixel in the columns of the sub-pixels LR and RB of the same colors located at both left and right edges of the display area DA may be appropriately determined in accordance with the color of each color filter layer 32 (refer to FIG. 3) on a trial basis so that false colors are not observed. In general, when the aperture ratios of the sub-pixels LR at the left edge and the sub-pixels RB at the right edge are lower than 40%, color display that is nearly normal is difficult and, instead of the sub-pixels LR and RB, sub-pixels inwardly adjacent to the sub-pixels LR and RB may generate false colors. In contrast, when the aperture ratios are higher than 80%, it is difficult to suppress generation of false colors. In addition, in general, when a pixel is formed of three sub-pixels of red (R), green (G), and blue (B), the luminosity is highest for green (G), and the luminosities of blue (B) and red (R) are lower than that of green (G). Therefore, it is preferable not to arrange sub-pixels of green (G) at the two edges of a display area in order to cause false colors to be hardly visible at portions around the two edges of the display area.

Second Embodiment

Figure 5:
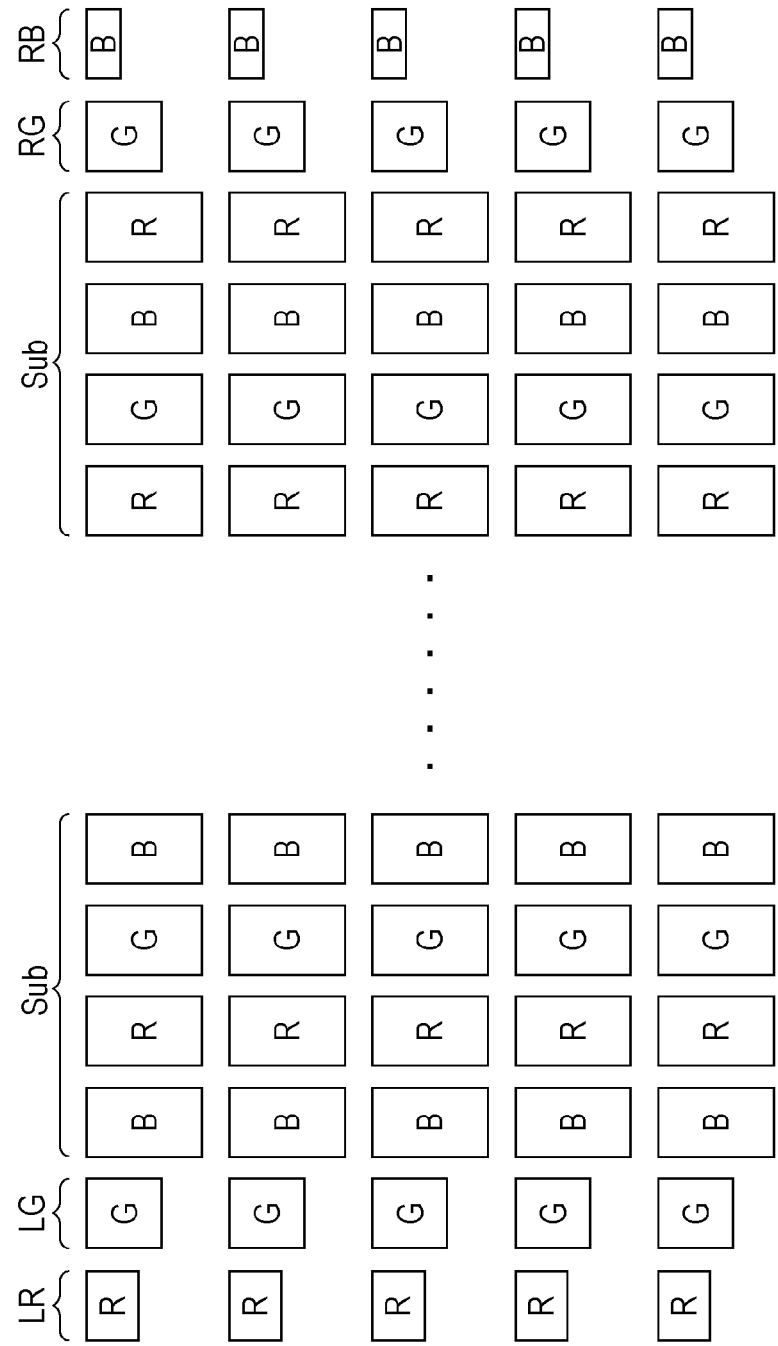
FIG. 5 is a diagram illustrating the configuration of sub-pixels at both left and right edges of a display area in the liquid crystal apparatus according to the second embodiment.
Figure 6A:
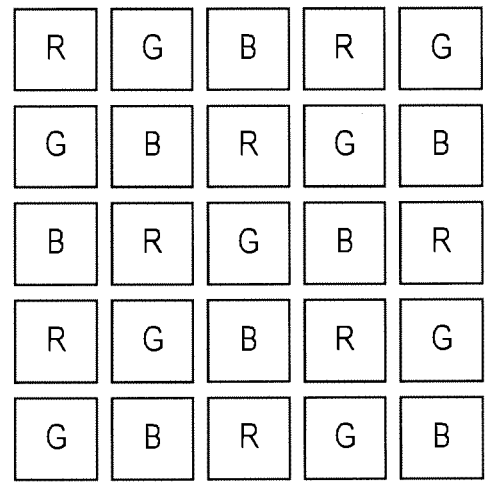
FIG. 6A is a diagram illustrating an example of a diagonal arrangement.
Figure 6B:
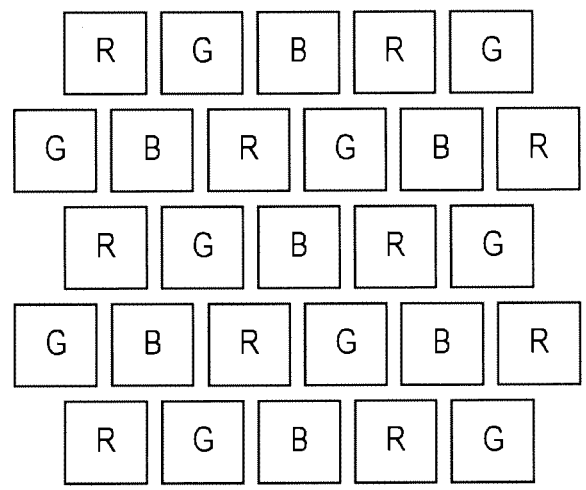
FIG. 6B is a diagram illustrating an example of a triangular arrangement.
Figure 6C:
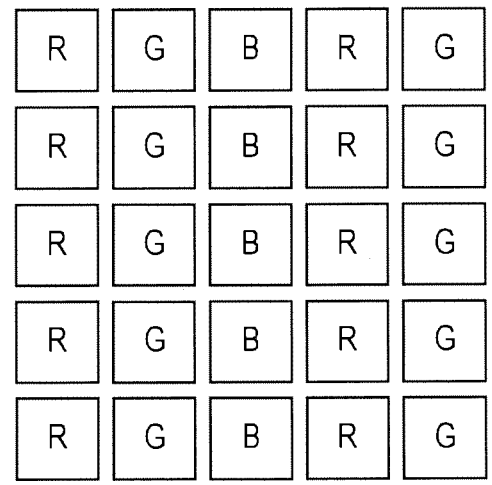
FIG. 6C is a diagram illustrating an example of a stripe arrangement.

Next, a liquid crystal display apparatus 10B according to a second embodiment will be described with reference to FIG. 5. The configuration of the liquid crystal display apparatus 10B according to the second embodiment is different from that of the liquid crystal display apparatus 10A according to the first embodiment in that not only the sub-pixels LR located at the left edge of the display area DA and the sub-pixels RB located at the right edge of the display area DA but also sub-pixels LG and RG that are inwardly adjacent to the sub-pixels LR and RB, respectively, have reduced aperture ratios. Because the rest of the specific configuration of the liquid crystal display apparatus 10B according to the second embodiment is the same as that of the liquid crystal display apparatus 10A according to the first embodiment illustrated in FIGS. 1 to 3, detailed description thereof is omitted.

In the liquid crystal display apparatus 10B according to the second embodiment, the aperture ratio of each sub-pixel in the column of the sub-pixels LR located at the left edge of the display area DA and in the column of the sub-pixels RB located at the right edge of the display area DA is configured to be the lowest. The aperture ratio of each sub-pixel in the columns of the sub-pixels LG and RG that are located inward from the sub-pixels LR and RB, respectively, is configured to be lower than those of sub-pixels Sub located in a center portion of the display area DA and higher than that of each sub-pixel of the sub-pixels LR and RB.

More specifically, if the aperture ratios of the sub-pixels Sub of the same color located in a center portion of the display area DA are assumed to be 100%, the aperture ratios of the sub-pixel columns located at both left and right edges of the display area DA are set to 30% to 50% when the sub-pixel columns are formed of sub-pixels of red (R), and 10% to 30% when the sub-pixel columns are formed of sub-pixels of blue (B). Furthermore, the aperture ratios of sub-pixel columns of green (G) that are each inwardly adjacent to the sub-pixels columns of red (R) and blue (B) are set to 50% to 70%.

The reasons why the aperture ratio of each sub-pixel in the sub-pixel columns located at the left and right edges of the display area DA are differentiated in accordance with color is that red (R), green (G), and blue (B) have different luminosities and that, in the case of adopting a color filter substrate as in a liquid crystal display apparatus or the like, the color density is different depending on the color of each filter. In general, when a pixel is formed of three sub-pixels of red (R), green (G), and blue (B), the luminosity is highest for green (G) and lowest for red (R). Therefore, in order to cause false colors to be hardly visible at portions around the two edges of a display area, it is preferable not to arrange sub-pixels of green (G) at the two edges of the display area. At sub-pixel columns of red (R) and blue (B) located at the two edges of the display area, it is preferable to slightly increase the aperture ratios of the sub-pixels of red (R) compared to those of the sub-pixels of blue (B).

Thus, in the liquid crystal display apparatus 10B according to the second embodiment, the aperture ratio of each sub-pixel in two columns of the sub-pixels located at the two edges of the display area DA in the arrangement direction of the sub-pixel columns, that is, at both left and right edges, are appropriately adjusted in order to suppress false colors from being seen at both left and right edges of the display area DA in which sub-pixels are disposed in a stripe arrangement. In the liquid crystal display apparatus 10B according to the second embodiment, since false colors are hardly visible both at the sub-pixel columns located at both left and right edges and at the sub-pixel columns located inward from the above sub-pixel columns, a more excellent effect than in the case of the liquid crystal display apparatus 10A according to the first embodiment can be obtained in terms of causing false colors to be hardly visible.

In consideration of the above description, it is to be understood that the number of sub-pixel columns that are located inward from the sub-pixel columns located at both left and right edges and whose aperture ratios are reduced may be one, or may be two or more. However, if the number of sub-pixel columns that are located at both left and right edges and whose aperture ratios are reduced increases, portions around both left and right edges proportionally seem slightly blurred and the screen looks smaller. In contrast, if the number of sub-pixel columns that are located at both left and right edges and whose aperture ratios are reduced is small, the display seems sharper.

It is to be noted that although a liquid crystal display apparatus has been described as an example of an electro-optical display apparatus in the first and second embodiments described above, the present application can also be applied to an electro-optical display apparatus such as an electrophoretic display apparatus, an organic EL display apparatus, an inorganic EL display apparatus, a plasma display apparatus, a field emission display, or the like as well.

It is also to be noted that although the sub-pixel columns are arranged in the order of red (R), green (G), and blue (B) in the first and second embodiments described above, the present application can also be applied to sub-pixel columns that further include another color (for example, white (W), magenta (M), cyan (C), yellow (Y), or the like) or sub-pixel columns in which the order of arranging red (R), green (G), and blue (B) is different as well, so long as the sub-pixel columns are disposed in a stripe arrangement.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An electro-optical display apparatus comprising:
a display area in which sub-pixel columns formed of sub-pixels of the same color that are linearly arranged in a single direction are disposed in a stripe arrangement together with sub-pixel columns of other colors,
wherein an aperture ratio of each sub-pixel in at least one sub-pixel column located at one edge of the display area in an arrangement direction of the sub-pixel columns and at least one sub-pixel column located at another edge of the display area in the arrangement direction of the sub-pixel columns are configured to be lower than those of sub-pixels of the same color located in a center portion of the display area, and
wherein the aperture ratio of each sub-pixel in two sub-pixel columns that are each inwardly adjacent to the sub-pixel columns located at the two edges in the arrangement direction of the sub-pixel columns is set to a ratio having a value between that of the aperture ratio of each sub-pixel in the sub-pixel columns located at the two edges in the arrangement direction of the sub-pixel columns and that of the aperture ratios of the sub-pixels of the same color located in the center portion of the display area.

2. The electro-optical display apparatus according to claim 1,
wherein the display area includes a pixel column that is formed of sub-pixel columns of three colors of red, green, and blue and that is arranged adjacent to another pixel column, and
wherein the sub-pixel columns located at the two edges in the arrangement direction of the sub-pixel columns are red and blue, respectively.

3. The electro-optical display apparatus according to claim 1,
wherein, if the aperture ratios of the sub-pixels of the same color located in the center portion of the display apparatus are assumed to be 100%, the aperture ratio of each sub-pixel in the sub-pixel columns located at the two edges of the display area in the arrangement direction of the sub-pixel columns is set to 40% to 80%.

4. The electro-optical display apparatus according to claim 1,
wherein the display area includes a pixel column that is formed of sub-pixel columns of three colors of red, green, and blue and that is arranged adjacent to another pixel column,
wherein the sub-pixel columns located at the two edges in the arrangement direction of the sub-pixel columns are red and blue, respectively,
wherein, if the aperture ratios of the sub-pixels of the same color located in the center portion of the display apparatus are assumed to be 100%, the aperture ratio of each sub-pixel in the sub-pixel columns located at the two edges of the display area in the arrangement direction of the sub-pixel columns is set to 30% to 50% for the sub-pixel column of red and 10% to 30% for the sub-pixel column of blue, and
wherein the aperture ratios of sub-pixel columns of green that are each inwardly adjacent to the sub-pixel columns of red and blue are set to 50% to 70%.

* * * * *